US008029051B2

(12) United States Patent
Favaretto

(10) Patent No.: US 8,029,051 B2
(45) Date of Patent: Oct. 4, 2011

(54) METAL AUTOMOBILE FRAME OF EXTRUDED MEMBERS

(75) Inventor: Fabrizio Favaretto, Formigine (IT)

(73) Assignee: Ferrari S.p.A, Modena (IT)

( * ) Notice: Subject to any disclaimer, the term of this patent is extended or adjusted under 35 U.S.C. 154(b) by 188 days.

(21) Appl. No.: 12/295,466

(22) PCT Filed: Mar. 29, 2007

(86) PCT No.: PCT/IB2007/000798
§ 371 (c)(1),
(2), (4) Date: Mar. 24, 2009

(87) PCT Pub. No.: WO2007/116269
PCT Pub. Date: Oct. 18, 2007

(65) Prior Publication Data
US 2009/0212601 A1     Aug. 27, 2009

(30) Foreign Application Priority Data
Mar. 31, 2006   (IT) .............................. BO2006A0229

(51) Int. Cl.
*B62D 23/00*   (2006.01)
(52) U.S. Cl. ..................................................... 296/205
(58) Field of Classification Search ............ 296/203.01, 296/204, 205, 203.04, 29, 30
See application file for complete search history.

(56) References Cited

U.S. PATENT DOCUMENTS

| 5,996,645 | A | 12/1999 | Hosokawa et al. | |
| 6,010,182 | A | 1/2000 | Townsend | |
| 6,258,465 | B1 * | 7/2001 | Oka et al. | 428/599 |
| 6,470,990 | B1 * | 10/2002 | Panoz | 180/311 |
| 6,533,348 | B1 * | 3/2003 | Jaekel et al. | 296/205 |
| 6,665,935 | B2 * | 12/2003 | Panoz | 29/897.2 |
| 6,722,037 | B2 * | 4/2004 | Nees et al. | 29/897.2 |
| 7,127,816 | B2 * | 10/2006 | Kiehl | 29/897.2 |
| 7,325,866 | B2 * | 2/2008 | Horton et al. | 296/205 |
| 7,389,586 | B2 * | 6/2008 | Patberg | 29/897.2 |
| 7,422,272 | B2 * | 9/2008 | Horton et al. | 296/205 |
| 7,500,802 | B2 * | 3/2009 | Patberg | 403/207 |
| 7,503,623 | B2 * | 3/2009 | Favaretto | 296/203.01 |
| 7,770,604 | B2 * | 8/2010 | Sjoberg | 138/177 |

FOREIGN PATENT DOCUMENTS

| DE | 197 41 262 | 3/1999 |
| WO | 2005 061311 | 7/2005 |

* cited by examiner

*Primary Examiner* — H Gutman
(74) *Attorney, Agent, or Firm* — Oblon, Spivak, McClelland, Maier & Neustadt, L.L.P.

(57) ABSTRACT

A metal automobile frame including a number of extruded, constant-section linear bars welded to one another at structural nodes defined by connecting bodies with pockets for housing the linear bars. A pierced linear bar includes a number of tabs, each of which is located inside the pierced linear bar, extends perpendicularly from a side of the pierced linear bar, and is sized so as not to interfere with the opening in the pierced linear bar.

8 Claims, 3 Drawing Sheets

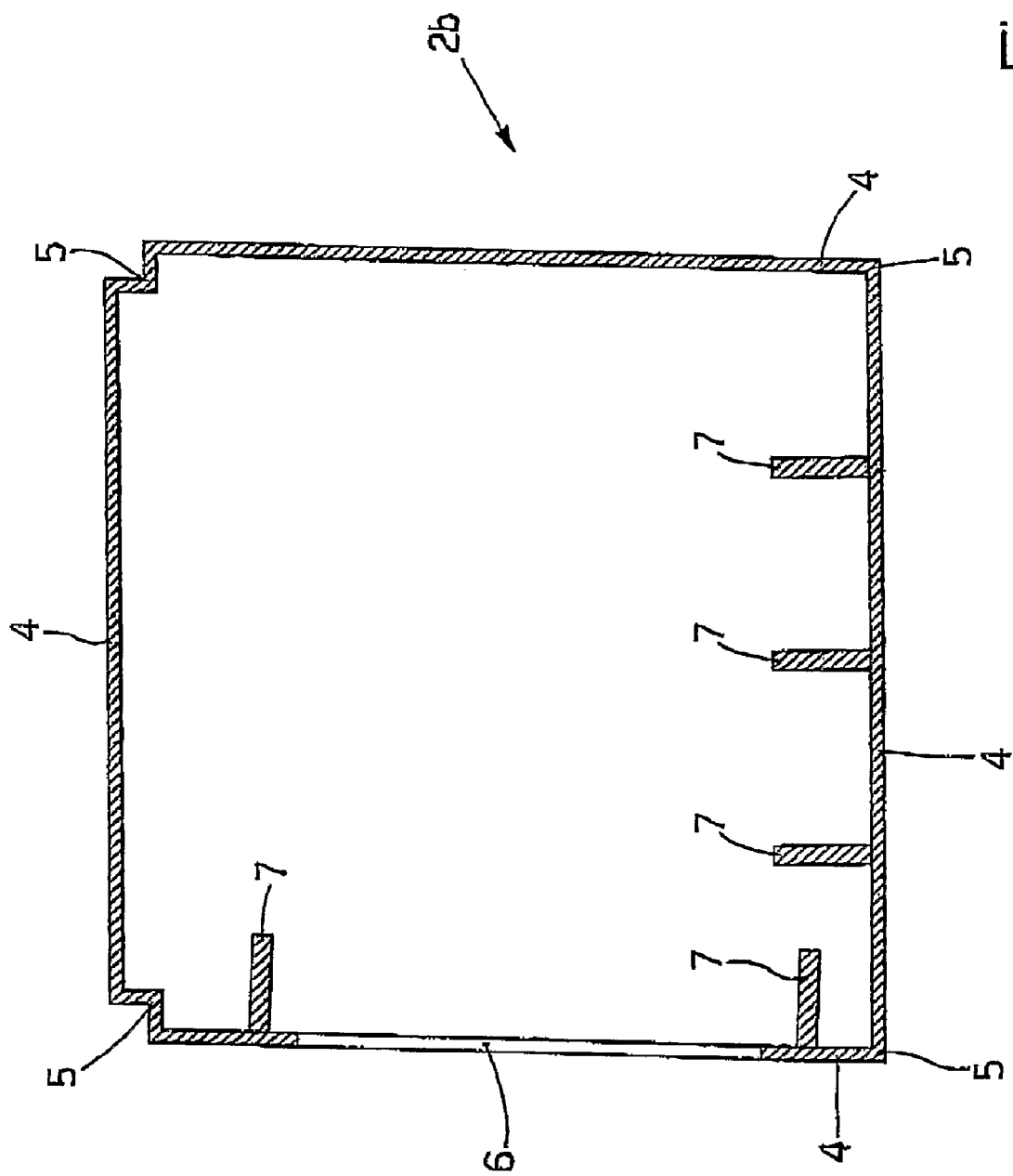

METAL AUTOMOBILE FRAME OF EXTRUDED MEMBERS

TECHNICAL FIELD

The present invention relates to a metal automobile frame of extruded members.

BACKGROUND ART

A metal automobile frame of extruded members comprises a number of extruded, constant-section, linear bars welded to one another at structural nodes defined by connecting bodies with pockets for housing the ends of the linear bars.

The linear bars are hollow, and normally have a closed polygonal cross section. At certain points on the frame, openings must be formed through one or more linear bars to house component parts of the automobile, as, for example, at the attachments for the front or rear suspensions.

Forming an opening in one wall of a linear bar, however, locally reduces the mechanical strength of the bar, which must be compensated by increasing the thickness, and therefore greatly increasing the weight, of the bar.

DISCLOSURE OF INVENTION

It is an object of the present invention to provide a metal automobile frame of extruded members, which is as lightweight as possible for a given performance.

BRIEF DESCRIPTION OF THE DRAWINGS

A non-limiting embodiment of the present invention will be described by way of example with reference to the accompanying drawings, in which:

FIG. 3 shows a cross section along line III-III of the pierced linear bar in FIG. 2.

BEST MODE FOR CARRYING OUT THE INVENTION

Figure 1:
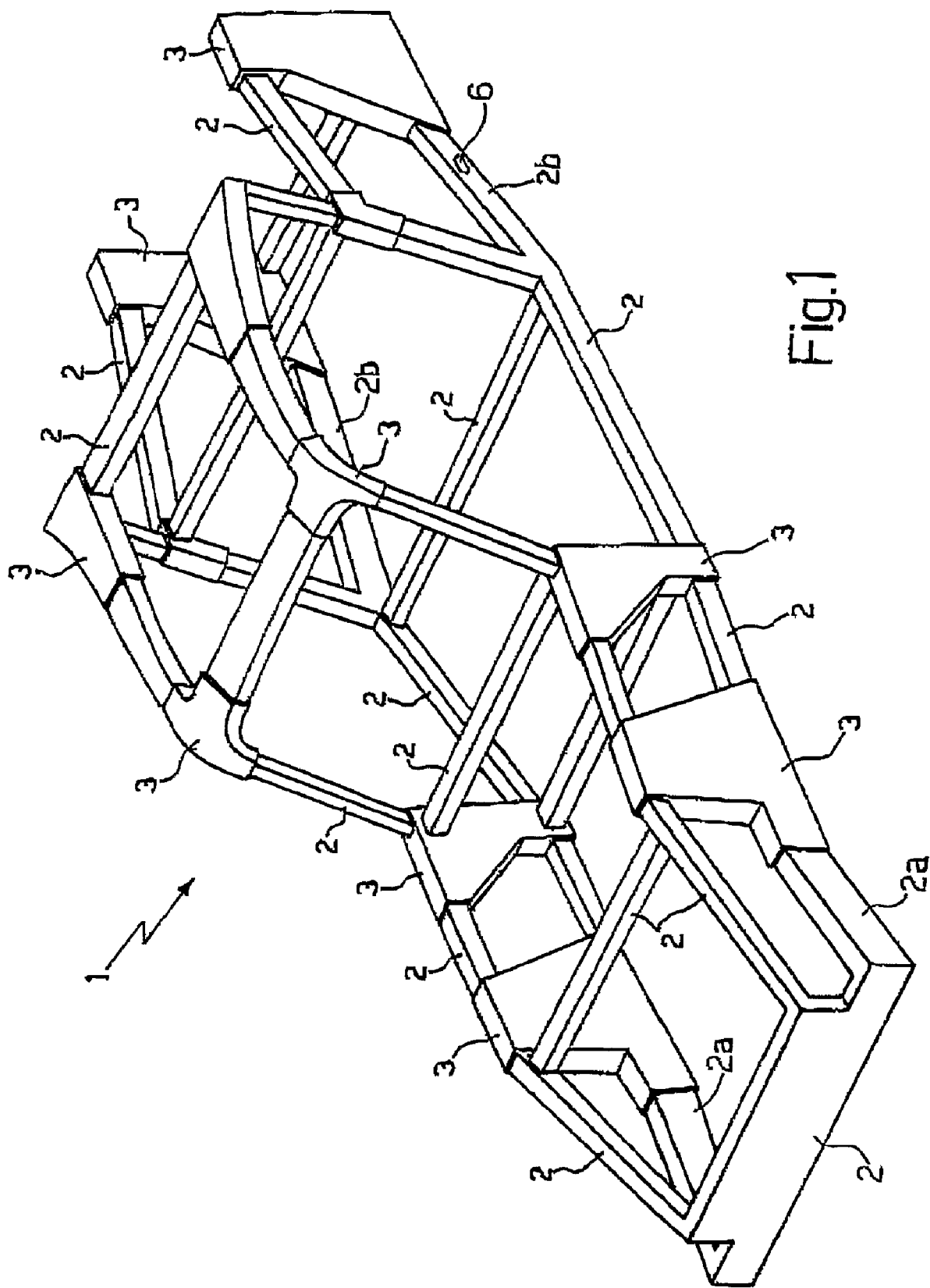
FIG. 1 shows a schematic view in perspective, with parts removed for clarity, of an automobile frame in accordance with the present invention.
Figure 2:
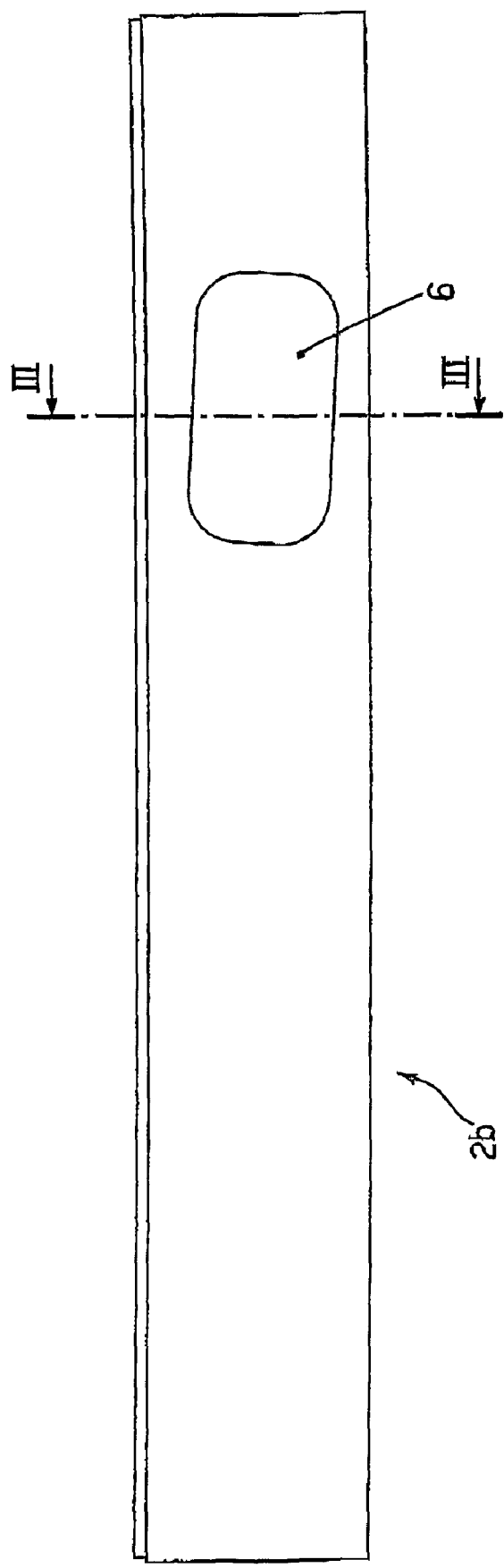
FIG. 2 shows a larger-scale front view of a pierced linear bar of the FIG. 1 frame.

Number 1 in FIG. 1 indicates as a whole an automobile frame, which comprises a number of extruded, constant-section, linear bars 2 welded to one another at structural nodes defined by connecting bodies 3. Linear bars 2 are extruded from metal (steel or aluminium), and therefore each have a constant cross section along its whole length.

Each connecting body 3 is box-shaped, and has pockets for housing the end portions of respective linear bars 2. Each connecting body 3 preferably comprises a supporting member—extruded and having a respective predetermined extrusion direction—joined to two flat sheet metal cover plates perpendicular to the extrusion direction and welded to opposite sides of the supporting member.

As shown in FIG. 3, for example, each linear bar 2 is hollow, and has a closed polygonal cross section comprising a number of sides 4, and a number of corners 5, at each of which at least two sides 4 join.

Two linear, controlled-strain bars 2a for absorbing collision energy are located at the front portion of frame 1.

In a preferred embodiment, as opposed to being parallel to a longitudinal axis of frame 1, the two linear, controlled-strain bars 2a diverge outwards with respect to longitudinal axis by an angle of 10°, so that they deform and effectively absorb collision energy in the event of both a perfect head-on collision (i.e. with a front obstacle perpendicular to longitudinal axis), and a front-lateral collision (i.e. with a front obstacle inclined at an angle with respect to longitudinal axis)

Two pierced linear bars 2b are located at the rear portion of frame 1, each at an attachment for a rear suspension (not shown), and each having, on one side 4, a through opening 6 for passage of a rear suspension lever.

As shown in FIG. 3, each pierced linear bar 2b comprises a number of tabs 7, each of which is located inside pierced linear bar 2b, extends perpendicularly from a side 4 of pierced linear bar 2b, and is sized so as not to interfere with opening 6 in pierced linear bar 2b. More specifically, each pierced linear bar 2b comprises two first tabs 7 extending perpendicularly from the side 4 with opening 6, and on opposite sides of opening 6; and three second tabs 7 extending perpendicularly from a side 4 perpendicular to the side 4 with opening 6.

In an alternative embodiment not shown, each pierced linear bar 2b has a first thickness at sides 4, and a second thickness, greater than the first thickness, at corners 5. More specifically, each pierced linear bar 2b is of the second thickness about each corner 5; each pierced linear bar 2b preferably varies gradually from the first thickness to the second thickness towards each corner 5; the ratio between the second thickness and first thickness normally ranges between 1.5 and 2; and the thickness is constant and equal to the second thickness about each corner 5, and is constant and equal to the first thickness at the centre of each side 4.

Pierced linear bars 2b as described above are easy to produce, by being extruded and so enabling tabs 7 and any differences in thickness between sides 4 and corners 5 to be achieved cheaply and easily.

Tests and calculations show that, with no change in performance, a pierced linear bar 2b as described above is 10-15% lighter than an equivalent pierced linear bar with no tabs 7. Moreover, if pierced linear bar 2b also varies in thickness and is of greater thickness at corners 5, it may be 15-20% lighter, with no change in performance, as compared with an equivalent pierced linear bar with no tabs 7 and of constant thickness.

The invention claimed is:

1. A metal automobile frame, comprising:
a plurality of extruded, constant-section linear bars welded to one another at structural nodes defined by connecting bodies including pockets to house the linear bars, wherein
each linear bar is hollow with a closed polygonal cross section comprising a plurality of walls and a plurality of corners each of which joining at least two of the walls,
at least one pierced linear bar of the plurality of linear bars includes at least one through opening on one of the walls, and
the pierced linear bar comprises a plurality of first and second fins, each of the fins being located inside the pierced linear bar, being parallelepiped shaped, having a solid rectangular cross-section, rising perpendicularly from one of the walls of the pierced linear bar and, and being disposed outside of a projection of the opening in the pierced linear bar.

2. A metal frame as claimed in claim 1, wherein the pierced linear bar comprises two of the first fins rising perpendicularly from the one of the walls with the opening and on respective opposite lateral sides of the opening.

3. A metal frame as claimed in claim 1, wherein the pierced linear bar comprises a plurality of the second fins rising perpendicularly from a wall perpendicular to the one of the walls with the opening.

4. A metal frame as claimed in claim 1, wherein the pierced linear bar has a first thickness at center portions of the walls, and has a second thickness, greater than the first thickness, at lateral portions of the walls around the corners.

5. A metal frame as claimed in claim 4, wherein a thickness of the pierced linear bar between the center portion of the walls and the lateral portions of the walls around the corners varies gradually from the first thickness to the second thickness towards each of the corners.

6. A metal frame as claimed in claim 5, wherein a ratio between the second thickness and the first thickness ranges between 1.5 and 2.

7. A metal frame as claimed in claim 5, wherein a thickness of the pierced linear bar is constant and equal to the second thickness at each of the corners, and is constant and equal to the first thickness at a center of each of the walls.

8. A metal frame as claimed in claim 1, comprising two of the pierced linear bars, each of the two pierced linear bars configured to be located at an attachment point for a rear suspension.

* * * * *